CONTROL CIRCUIT

Filed Aug. 27, 1954

INVENTOR
ROBERT L. PLOUFFE, JR.

BY [signature]
ATTORNEY

United States Patent Office 2,885,476

Patented May 5, 1959

2,885,476

CONTROL CIRCUIT

Robert L. Plouffe, Jr., Livingston, N.J., assignor to International Telephone and Telegraph Corporation, Nutley, N.J., a corporation of Maryland Application August 27, 1954, Serial No. 452,592

11 Claims. (Cl. 178—69)

This invention relates to multichannel transmission systems of the type in which various channels of intelligence are represented by discreet time spaced energy pulses and more particularly to a control circuit disposed in such transmission systems to prevent the loss of intelligence by failure of conditioning circuitry incorporated therein.

Various types of multichannel systems have been proposed wherein intelligence is conveyed by pulses modulated in amplitude, time duration, time position, or pulse code combinations. In these systems where it is desired to transmit the pulses by carrier waves for the purpose of radiation, or for other types of carrier transmission, a carrier wave may be modulated by these pulses either in phase or frequency. The carrier wave is transmitted over a transmission medium which may include several repeater stations. The receiving terminals receive the transmitted carrier waves which are detected to reproduce the original modulating pulse pattern. It is well known that the wave form of the received pulses may be distorted due to the circuitry and propagation medium traversed by the channel pulses. To reduce to a minimum this pulse distortion, a pulse reshaping circuit is usually incorporated in the repeater equipment. However, if by chance the reshaping circuit should fail, the channel pulses being transmitted would be lost at the repeater and the transmission of intelligence would be interrupted. This same loss of intelligence would occur at any point within the transmission system where the pulse signals are to be conditioned, such as in an amplifier or clipper.

Therefore, it is an object of this invention to provide a means at the output of a signal conditioning device, which is responsive to the absence of signal output from said conditioning device to by-pass the input signal about said conditioning device.

Another object of this invention is to provide in conjunction with the signal reshaping circuit of a multichannel pulse system a monitor circuit to monitor the output of the reshaping circuit, the monitor circuit including means responsive to the absence of any portion of a composite signal output of said reshaping circuit to by-pass the signal input around the reshaping circuit to prevent loss of communication.

A feature of this invention is the provision of a normally conductive electron discharge device, a monitor coupled to the output of the signal conditioning device to provide in response to the normal output of the device a bias voltage for said discharge device and a normally energized relay coupled to the anode of said discharge device having contacts for coupling the output of the conditioning device to succeeding portions of the communication system. Failure of the conditioning device will block a portion of or all of the normal output of the conditioning device which will be recognized by the monitor which thereupon places a bias potential on an electrode of said discharge device sufficient to cut off said discharge device, the non-conduction of said discharge device de-energizing said relay and thereby connecting other contacts thereof between the input of the conditioning device and the succeeding communication system portions to by-pass the input signal about said conditioning device.

Another feature of this invention is the provision of a bias voltage establishing means including a first electron discharge device coupled to the output of the conditioning device to amplify the signal output therefrom to a given value, a signal clamping means coupled to said first discharge device to clamp the output therefrom to a value corresponding to said given value but of opposite polarity, and peak detecting means coupled to said clamping means to detect the peak of the clamped signal, a second electron discharge device coupled to said peak detecting means biased in accordance to the output therefrom and a relay disposed in the anode circuit of said second discharge device. The presence of signal at the output of said conditioning device causes said bias voltage establishing means to bias said second discharge device into conduction, said conduction energizing said relay to cause certain contacts thereof to connect the output of the conditioning device to the succeeding circuitry while the absence of signal at the output of said conditioning device causes said bias voltage establishing means to render said second discharge device non-conductive, said non-conduction rendering said relay de-energized causing other contacts of said relay to couple the input signal to said conditioning device to the succeeding circuitry thereby bypassing the input signal about the conditioning device while still other contacts of said relay activate an alarm circuit to indicate failure of the conditioning device.

The above-mentioned and other features and objects of this invention will become more apparent by reference to the following description taken in conjunction with the accompanying drawings, in which.

Figure 1:
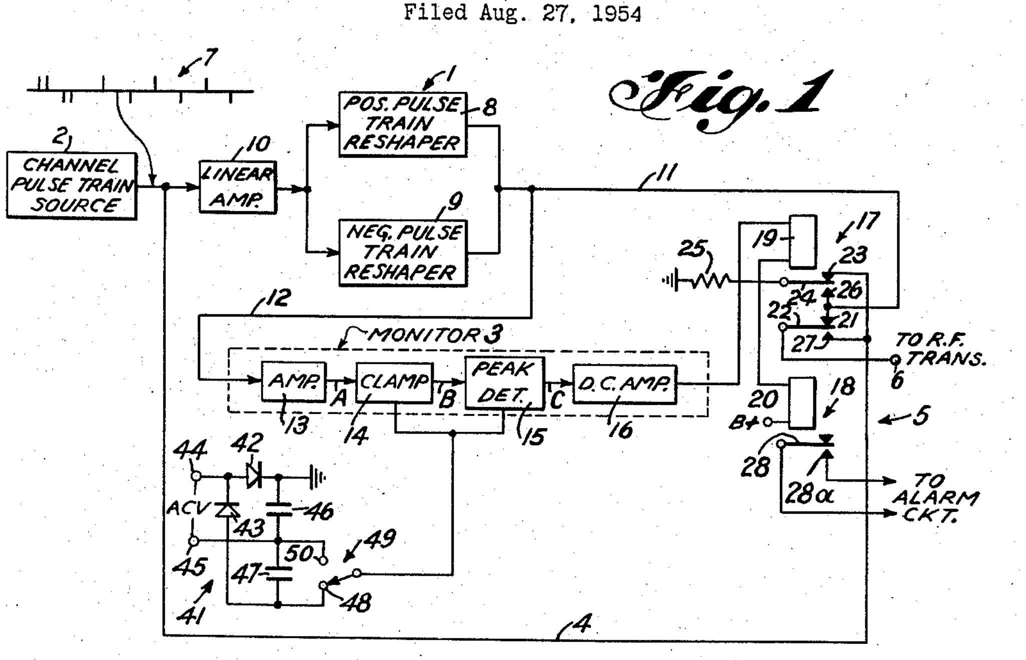
Fig. 1 is a block diagram of the reshaping portion of a multichannel pulse repeater including the control circuit of this invention.

Referring to Fig. 1, there is illustrated therein the reshaper 1 of a multichannel pulse circuit for reshaping the channel pulses applied thereto from pulse train source 2 prior to coupling the train or trains of pulses to a succeeding stage. As will be obvious, if the reshaper 1 fails for some reason, the pulse trains will not reach the succeeding stage and communication will be disrupted. It is the purpose of this invention to provide a monitor 3 coupled to the output of reshaper 1 to observe the condition of the output signal therefrom, a by-pass conductor 4 and a switching means 5 actuated by monitor 3 to connect the input signals from source 2 through conductor 4 to terminal 6 for by-passing reshaper 1 when failure occurs in reshaper 1. Other contacts of switching means 5 provide a connection between the output of reshaper 1 and terminal 6 when monitor 3 recognizes that portion 1 is operating properly. Switching means 5 further includes means to sound an alarm to indicate a failure has occurred in reshaper 1 which is activated by the output of monitor 3 when such a failure occurs.

Source 2 may comprise any portion of a communication system, either at the transmitter or receiver terminals or at a repeater station therebetween, wherein the pulse train is in video form. When pulse type communication systems were first contemplated and put into operation at various locations, the terminal equipment and repeaters were designed for operation with a carrier wave having a given frequency capable of providing communication over a given number of channels. As traffic increased, it became necessary to increase the number of channels transmitted. This could have been easily accomplished by changing the carrier wave frequency, but this would make obsolete the original carrier wave or radio frequency portions of the terminal and repeater equipment thereby necessitating a large expenditure by the operating company to increase their traffic handling capabilities in this manner. Thus, for the sake of economy, the carrier wave frequency was maintained substantially constant and schemes were devised to increase the number of channels capable of being transmitted by this given carrier wave frequency.

One scheme contemplated the interposing of additional channels in the spacing between the channels already present. This resulted in an increase of cross modulation in the modulator and thus reduced the efficiency of the communication system. To remove the objection of this cross modulation, it has been proposed to separately modulate two trains of pulses having the same polarity so that, for example, the odd pulses are modulated in one modulator and the even pulses in a separate modulator. These separate pulse trains are then combined so as to space the pulses of one modulator in the time integral intermediate the pulses from the other modulator. This reduced cross modulation in the modulators, but did not improve the cross modulation arising in other portions of the communication system.

A more desirable remedy to the problem of increasing the capacity of the communication system without changing the carrier wave signals and to minimize the cross talk or cross modulation in such a system is described in U.S. Patent No. 2,607,035 to A. M. Levine. The communication system described therein provides two separate pulse trains individually modulated in separate pulse modulators. The pulse train from one of these modulators is inverted in polarity with respect to the other pulse train and these two pulse trains are used to angularly modulate a source of carrier frequency. In this manner the given carrier frequency may carry both pulse trains with a minimum of cross talk resulting at the modulator or in other portions of the communication system. At the receiver end of the system the carrier wave is received and detected to reproduce the original pulse patterns. Pulses of the two patterns are then separated with one of the pulse trains being inverted prior to applying the two pulse trains to the demodulator equipments.

It is proposed that the control circuit of this invention may be utilized in conjunction with the earlier communication system, a single pulse train type of communication system, and with the expanded communication system, the double pulse train type of communication, as described in the above-mentioned patent. Thus, source 2 will present to the reshaper 1 a single pulse train having a given number of channels, or a double pulse train, such as indicated at 7, when the communication system of the above patent is employed. A control switch is provided in the control circuit to establish the operation thereof in accordance with the received signal. Where the conditioning device is a pulse shaper, the pulse shaper will be located prior to the radio frequency transmitting equipment of the repeater as illustrated.

Reshaper 1 includes positive pulse shaper 8 and negative pulse shaper 9 connected in parallel to the output of source 2 through a linear amplifier 10 which functions to amplify the pulse patterns without adding distortion to the already distorted pulse trains. The substantially undistorted output of shapers 8 and 9 are connected to a common conductor 11 which ultimately conducts the shaped pulse trains to terminal 6 and hence to the succeeding portion of the repeater, illustrated herein as the radio frequency transmitter equipment. Either shaper 8 or shaper 9, depending upon the polarity of the pulse signal received, will be utilized to reshape the pulse train when a single pulse train is employed for communication. The output of shapers 8 and 9 besides being coupled along conductor 11 is coupled along conductor 12 to monitor 3. Monitor 3 includes an amplifier 13 to raise the level of the output from reshaper 1 to a given value, a clamping circuit 14 to clamp the amplified output of amplifier 13 to a value equivalent to the level of the output of amplifier 13 but negative in polarity, a peak detector 15 for detecting the peak of the clamped signal and a D.-C. amplifier 16 whose conduction is controlled by the output of detector 15, the conduction of amplifier 16 controlling the position of selective switching means 5. Monitor 3 is responsive to the presence or absence of the composite received signal at the output of reshaper 1 for control of relays 17 and 18. When reshaper 1 is functioning properly, monitor 3, by the conduction of amplifier 16, produces sufficient current for conduction through coils 19 and 20 to activate or energize relays 17 and 18. The position of the contacts as illustrated represent the energized positioning of these contacts. Thus, with shapers 8 and 9 functioning properly, the output thereof is conducted along conductor 11 to contact 21 through armature 22 and hence to terminal 6. Contact 23 and armature 24 of relay 17 places a terminating resistor 25 across the by-pass conductor 4 to prevent the signal thereon from interfering with the normal passage of the output of reshaper 1 to terminal 6.

When a failure occurs in reshaper 1, the output of reshaper 1 is drastically reduced by an absence of one or both of the pulse trains. Monitor 3 detects this reduction or absence and amplifier 16 is cut off, removing the energizing current from coils 19 and 20 and thereby de-energizes relays 17 and 18. Upon de-energizing relays 17 and 18, armature 24 moves to make contact with contact 26 which places resistor 25 across the output of reshaper 1 preventing a feedback loop which would cause a chattering of the relays. Armature 22 moves to make contact with contact 27 which connects by-pass conductor 4 to terminal 6 permitting the by-passing of the output of source 2 to the output means, or terminal 6. This control arrangement assures that an input is present at terminal 6 regardless of whether reshaper 1 is working or not, and thus prevents the loss of communication. It is true that the pulse trains by-passed about reshaper 1 may be considerably distorted and the resultant reception and demodulation may not be as sharp and clean as desired, but even so, this type of intelligence is better than no intelligence at all. It will be observed that relay 18 does not enter directly into the by-passing of the output of source 2 about reshaper 1, however, this relay plays an important part in the operation of terminal or repeater equipment. When relay 18 is de-energized armature 28 makes contact with contact **28*a*** which operates an alarm circuit, such as a buzzer, to indicate to operator that a failure has occurred in the conditioning device and that steps should be taken towards correcting the failure as soon as possible.

Figure 2:
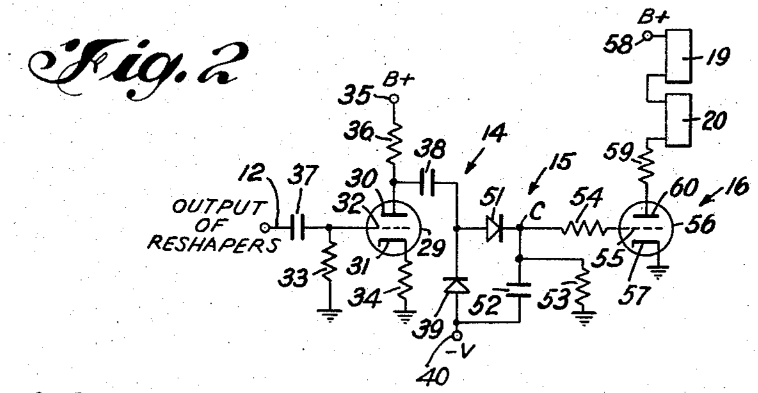
Fig. 2 is a schematic diagram of the monitor circuit of Fig. 1.
Figure 3:
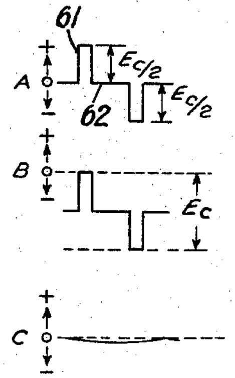
Figs. 3 and 4 are graphical illustrations useful in explaining the operation of the control circuit of this invention.
Figure 4:
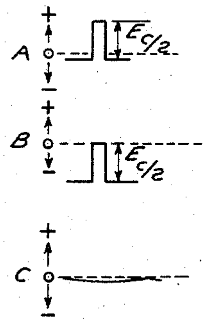

Referring to Figs. 2, 3 and 4, the operation of monitor 3 will be discussed in more detail. Consider first that communication is to be carried on by a pair of pulse trains as illustrated by wave form 7 of Fig. 1 and that reshaper 1 is operating as intended. The composite pulse train is coupled along conductor 12 through coupling condenser 37 to amplifier 13 which functions to amplify the composite pulse train to a given peak-to-peak voltage $E_c$, say for example 18 volts, as indicated in curve A of Fig. 3. Amplifier 13 includes an electron discharge device 29 having at least an anode 30, a cathode 31 and a control grid 32. The grid leak resistor 33 and cathode resistor 34 cooperate with the $B^+$ voltage at terminal 35 and the low resistor 36 to appropriately establish the amplification of device 29 such that the desired peak-to-peak amplitude, curve A of Fig. 3, is achieved at point A, the anode 30 of device 29.

The output of amplifier 13 is coupled to the clamp circuit 14 which clamps the bottom of the wave form illustrated in curve A of Fig. 3 to a negative value substantially equivalent to the peak-to-peak voltage $E_c$. Clamp circuit 14 includes condenser 38 and rectifier 39. The level to which the signal is clamped is established by the bias voltage coupled to terminal 40. The voltage at terminal 40 is provided by the power supply 41 of Fig. 1 and includes rectifiers 42 and 43 for rectification of an A.-C. voltage coupled to terminals 44 and 45 with the customary ripple thereon being substantially eliminated by the filtering action of condensers 46 and 47. The negative bias voltage, having a magnitude equivalent to $E_c$, is supplied through contact 48 of switch 49 for the double pulse train type of communication while a negative bias voltage, having a magnitude of $E_c/2$, is supplied through contact 50 of switch 49 for the single pulse train type of communication. The output of clamp circuit 14 is coupled from point B, the shape of which is illustrated in curve B of Fig. 3.

The clamped output at point B is coupled to peak detector 15 which includes rectifier 51 and condenser 52. The operation of the peak detector 15 is referred to the same level as the clamp circuit 14 by connecting one side of condenser 52 to the terminal 40. The output of detector 15, the peak value of the clamped signal as developed at point C across resistor 53 is represented in curve C of Fig. 3. The voltage at point C, substantially zero volts for the example herein employed, is coupled through coupling resistor 54 to grid 55 of electron discharge device 56, the major component of amplifier 16. The cathode 57 of device 56 is returned directly to ground. The B+ voltage at terminal 58, the value of the resistance of relay coils 19 and 20 and the current limiting resistor 59 are such that the cut-off potential of device 56 occurs when grid 55 is sufficiently negative with respect to cathode 57, such as 6 volts. Thus, when there is no failure in reshaper 1 the output of detector 15 will place grid 55 at a potential of substantially zero volts with the respect to cathode 57 and the device 56 will conduct, the amount of plate current being limited to a given value by the resistor 59 and the resistance of the relay coils 19 and 20 disposed in series with the anode 60 of device 56. The conduction of device 56 energizes relays 17 and 18, contacts of which connect conductor 11 to terminal 6 as hereinabove described.

Consider now what occurs when either or both of the pulse trains are absent at the output of reshaper 1. For purposes of explanation, assume that shaper 9 fails and the negative pulse train is absent. The positive pulse train will be amplified by amplifier 13 to the $E_c/2$, 9 volts for the example herein employed, and only pulse 61 of Fig. 3 will be present at point A. Clamp 14 will clamp the bottom 62 of pulse 61 to minus $E_c$, minus 18 volts, and the detector 15 will develop at point C a potential of minus 9 volts. This developed potential is below the cut-off potential of device 56 and thus conduction is stopped. Loss of conduction in device 56 de-energizes relays 17 and 18 which, through the contacts thereof, couples the output signal of source 2 along conductor 4 and hence to terminal 6 as hereinabove described and at the same time activates the alarm circuit.

If the negative pulse train is present and the positive pulse train is absent the same potential, minus 9 volts, will be coupled to grid 55 which cuts off device 56. If both pulse trains are absent at the output of reshaper 1, then the potential coupled to grid 55 will be minus 18 volts which, as is obvious, again renders device 56 nonconductive.

The detailed discussion thus far has been concerned with the operation of monitor 3 in a system employing a double pulse train type of communication. As pointed out above, the control system of this invention may be employed not only with the double pulse train type of communication but also where a single pulse train type of communication is employed. For operation in a single pulse train type communication system switch 49 is moved to couple the voltage at terminal 50 of the power supply 41 to terminal 40. For the example herein employed, the voltage coupled to terminal 40 would have a value of minus 9 volts which as will be obvious to those skilled in the art will change the level to which the output of amplifier 13 is clamped. As before, amplifier 13 raises the input pulse applied thereto to a value of 9 volts, as represented in curve A of Fig. 4. The amplified input pulse is clamped by clamp circuit 14 to a minus 9 volt level, substantially as indicated in curve B of Fig. 4. The detector 15 functioning as before produces an output equivalent to the peak of the wave form, as indicated in curve C of Fig. 4, which for the example herein employed is substantially zero. This potential coupled to grid 55 of device 56 causes conduction therein and energizes relays 17 and 18 to cause connection of conductor 11 to terminal 6. A loss of the pulse train at the output of reshaper 1 will mean that the monitor 3 will supply a negative voltage, minus 9 volts, to grid 55 of the normally conducting device 56 which stops the conduction thereof. The non-conduction of device 56 de-energizes relays 17 and 18 and thereby connects conductor 4 to terminal 6 to by-pass the output of source 2 about reshaper 1 and further causes activation of an alarm circuit to indicate a loss of signal in reshaper 1.

The operation of the control circuit of this invention if used with a single pulse train type of communication has been described in connection with a single pulse train of positive polarity, but as will be obvious the monitor 3 and associated relays will respond as hereinabove described to a single pulse train of a negative polarity.

The operation of the control circuit of this invention has been described in detail in connection with the reshaper of a pulse communication system to prevent the loss of communication when this reshaper fails. It should be obvious that the control circuit herein described is not limited to by-passing a signal around a reshaper to prevent loss of communication, but may, in a manner substantially as herein described, be employed with other types of signal conditioning devices, such as amplifiers and clipping circuits, without departing from the spirit of this invention.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a communication system, a signal conditioning device, an output means, a source of signals coupled to the input of said conditioning device, a selective switching means arranged for coupling the output of said conditioning device to said output means in a first switching position thereof and said source of signals to said output means in a second switching position thereof, and means coupled to the output of said conditioning device responsive in the presence of signal at the output of said conditioning device to cause said switching means to assume said first position and responsive to the absence of signal at the output of said conditioning device to cause said switching means to assume said second position, said means coupled to the output of said conditioning device including an electron discharge device having at least a cathode, a control grid and an anode and a signal responsive means coupled between said control grid and the output of said conditioning device to develop in accordance with the magnitude of the output signal therefrom a bias voltage to control the conduction condition of said discharge device.

2. The system according to claim 1, wherein said switching means includes a relay disposed in the anode circuit of said discharge device responsive to the conduction condition of said discharge device, the conduction of said discharge device causing said relay to assume said first position and the non-conduction of said discharge device causing said relay to assume said second position.

3. The system according to claim 1, wherein said signal responsive means includes an amplifier coupled to the output of said conditioning device, said amplifier providing a given signal level at the output thereof in the presence of signal at the output of said conditioning device, a clamping circuit to clamp the output of said amplifier at a negative value corresponding in magnitude to said given signal level and a peak detector to detect the peak voltage value of the clamped signal, the output therefrom constituting the bias voltage for said discharge device.

4. The system according to claim 1, wherein said signal responsive means includes a second electron discharge device having at least a cathode, a control grid, and an anode, means to capacitively couple the output of said conditioning device between the control grid and the cathode of said second discharge device, means to bias said second discharge device to provide in the presence of input signal thereto an output at the anode thereof having a constant given signal level, a first condenser, a first rectifier and a negative bias voltage source arranged in serial order in the order named coupled in shunt relation to said second discharge device between the anode and cathode thereof to clamp the output of said second electron discharge device to a given negative value corresponding to the magnitude of said given signal level, a second condenser and a second rectifier arranged in serial order coupled in shunt relation to said first rectifier to detect the peak voltage value of the clamped signal, and means to directly couple the peak voltage value to the control grid of the first electron discharge device as a bias voltage therefor.

5. In a communication system, a signal conditioning device, an output means, a source of signals coupled to the input of said conditioning device, a selective switching means arranged for coupling the output of said conditioning device to said output means in a first switching position thereof and said source of signals to said output means in a second switching position thereof, and means coupled to the output of said conditioning device responsive in the presence of signal at the output of said conditioning device to cause said switching means to assume said first position and responsive to the absence of signal at the output of said conditioning device to cause said switching means to assume said second position, said means coupled to the output of said conditioning device including a first electron discharge device having at least a cathode, a control grid, and an anode, means capacitively coupling the output of said conditioning device between the control grid and the cathode of said first discharge device, means to bias said first discharge device to provide in the presence of input signal thereto an output at the anode thereof having a constant given signal level, a first condenser, a first rectifier and a negative bias voltage source arranged in serial order in the order named coupled in shunt relation to said first discharge device between the anode and cathode thereof to clamp the output of said first electron discharge device to a given negative value corresponding to the magnitude of said given signal level, a second condenser and a second rectifier arranged in serial order coupled in shunt relation to said first rectifier to detect the peak voltage value of the clamped signal, a second electron discharge device having at least a cathode, a control grid and an anode and means to directly couple the peak voltage value to the control grid of said second electron discharge device to control the conduction thereof such that the output of said second electron discharge device causes said switching means to assume the appropriate switching position in accordance with the signal coupled to said first electron discharge device.

6. In a communication system, a signal conditioning device, an output means, a source of signals coupled to the input of said conditioning device, a selective switching means arranged for coupling the output of said conditioning device to said output means in a first switching position thereof and said source of signals to said output means in a second switching position thereof, and means coupled to the output of said conditioning device responsive in the presence of signal at the output of said conditioning device to cause said switching means to assume said first position and responsive to the absence of signal at the output of said conditioning device to cause said switching means to assume said second position, the signal of said source including a pair of pulse trains each having a plurality of channel pulses spaced one from the other by a given time interval with the channel pulses of one of said pulse trains being of opposite polarity with respect to the polarity of the pulses of the other of said pulse trains, said one of said pulse trains being interleaved intermediate the time interval between the channel pulses of the other of said pulse trains and said conditioning device including a pulse signal reshaper having a shaping circuit for said one of said pulse trains and a shaping circuit for said other of said pulse trains, said shaping circuits being coupled in shunt relationship with respect to each other, said signal reshaper being disposed in series with respect to said source and said means coupled to the output of said conditioning device.

7. In a communication system, a signal conditioning device, an output means, a source of signals coupled to the input of said conditioning device, a relay arranged for coupling the output of said conditioning device to said output means when energized and said source of signals to said output means when de-energized, and a monitor coupled to the output of said conditioning device responsive in the presence of signal at the output of said conditioning device to energize said relay and responsive to the absence of signal at the output of said conditioning device to de-energize said relay, including an electron discharge device having ata least a cathode, a control grid and an anode and a signal responsive means coupled between said control grid and the output of said conditioning device to develop in accordance with the magnitude of the output signal therefrom a bias voltage to control the conduction condition of said discharge device.

8. The system according to claim 7, wherein said relay is disposed in the anode circuit of said discharge device responsive to the conduction condition of said discharge device, the conduction of said discharge device energizing said relay and the non-conduction of said discharge device de-energizing said relay.

9. The system according to claim 7, wherein said signal responsive means includes a second electron discharge device having at least a cathode, a control grid, and an anode, means to capacitively couple the output of said conditioning device between the control grid and the cathode of said second discharge device, means to bias said second discharge device to provide in the presence of input signal thereto an output at the anode thereof having a constant given signal level, a first condenser, a first rectifier and a negative bias voltage source arranged in serial order in the order named coupled in shunt relation to said second discharge device between the anode and cathode thereof to clamp the output of said second electron discharge device to a given negative value corresponding to the magnitude of said given signal level, a second condenser and a second rectifier arranged in serial order coupled in shunt relation to said first rectifier to detect the peak voltage value of the clamped signal, and means to directly couple the peak voltage value to the control grid of the first electron discharge device as a bias voltage therefor.

10. A control circuit to activate a switching means having two signal paths for connection of signals to one or the other of said signal paths in accordance with the presence or absence of signal at said control circuit comprising a first electron discharge device having at least a cathode, a control grid, and an anode, means to bias said first discharge device to provide in the presence of input signal thereto an output at the anode thereof having a constant given signal level, a first condenser, a first rectifier and a negative bias voltage source arranged in serial order in the order named coupled in shunt relation to said first discharge device between the anode and cathode thereof to clamp the output of said first electron discharge device to a given negative value corresponding to the magnitude of said given signal level, a second condenser and a second rectifier arranged in serial order coupled in shunt relation to said first rectifier to detect the peak voltage value of the clamped signal, a second electron discharge device having at least a cathode, a control grid and an anode and means to directly couple the peak voltage value to the control grid of said second electron discharge device to control the conduction thereof such that the output of said second electron discharge device causes said switching means to connect the signal to one signal path therein when signal is present at said first discharge device and to connect the signal to the other signal path therein when signal is absent at said first discharge device.

11. In a communication system, a signal conditioning device, an output means, a source of signals coupled to the input of said conditioning device, a selective switching means arranged for coupling the output of said conditioning device to said output means in a first switching position thereof and said source of signals to said output means in a second switching position thereof, and means coupled to the output of said conditioning device responsive in the presence of signal at the output of said conditioning device to cause said switching means to assume said first position and responsive to the absence of signal at the output of said conditioning device to cause said switching means to assume said second position, said means coupled to the output of said conditioning device including an amplifying device having a control element and a signal responsive means coupled between said control element and the output of said conditioning device to develop in accordance with the magnitude of the output signal therefrom a bias voltage to control the conduction condition of said amplifying device.

References Cited in the file of this patent

UNITED STATES PATENTS

| | | |
|---|---|---|
| 1,523,473 | Clark | Jan. 20, 1925 |
| 2,691,094 | Hilton | Oct. 5, 1954 |

FOREIGN PATENTS

| | | |
|---|---|---|
| 657,094 | Great Britain | Sept. 12, 1951 |